United States Patent Office 2,785,056
Patented Mar. 12, 1957

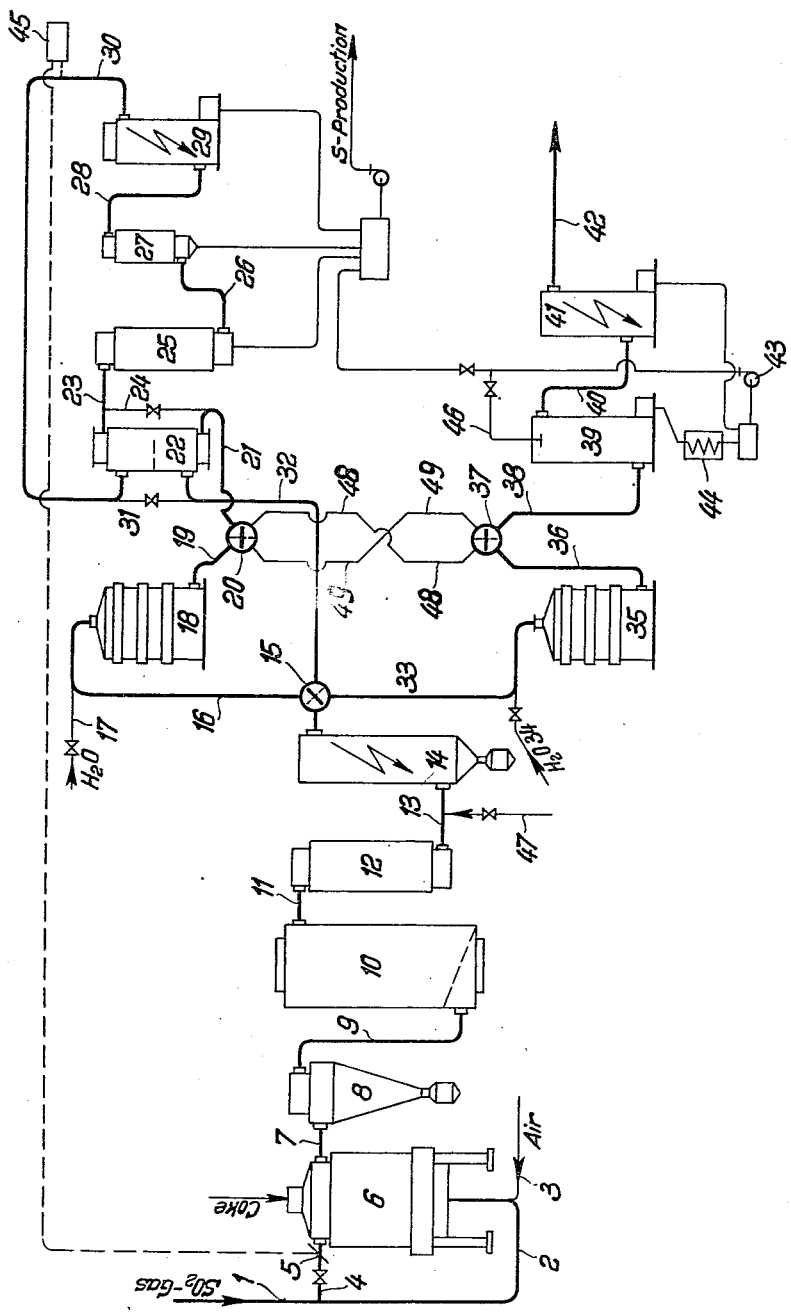

2,785,056

PROCESS FOR THE PRODUCTION OF SULFUR FROM HYDROGEN SULFIDE AND SULFUR DIOXIDE OR OXYGEN CONTAINING GASES

Wilhelm Thumm, Gerhard Roesner, and Friedrich Volk, Frankfurt am Main, Germany, assignors to Metallgesellschaft, A. G., Frankfurt am Main, Germany Application November 2, 1953, Serial No. 389,822

6 Claims. (Cl. 23—225)

The present invention relates to an improved process for the catalytic conversion of hydrogen sulfide and sulfur dioxide or oxygen containing gases with the production of elemental sulfur and more particularly to such a process in which the gases to be converted are passed through a series of catalysts at least one of which is maintained above the dew point of the sulfur produced and at least another of which is operated at a temperature below the dew point of sulfur.

A number of catalytic processes have been proposed for the conversion of hydrogen sulfide and sulfur dioxide containing gases to elemental sulfur, such as, for example, the Claus process in which such gases are converted with $Fe_2O_3$ and $Al_2O_3$ containing catalysts. Such processes have been operated at various temperatures, for example, processes are known in which the temperature employed is above the dew point of the sulfur in the gas mixture. There are also some processes which operate below the dew point and even the melting point of sulfur so that the sulfur in part collects upon the catalyst in liquid or solid form.

Such processes have also been employed in conjunction with procedures for the reduction of sulfur dioxide with solid, liquid or gaseous reducing agents. In such reduction processes, besides sulfur, carbon oxysulfide and carbon disulfide, hydrogen sulfide is also formed which is then reacted with further sulfur dioxide.

The previously known processes have the disadvantage, that when the conversion is effected at higher temperatures only an incomplete conversion can be obtained whereas at lower temperatures below the dew point of the sulfur produced, deposit of the sulfur on the catalysts cannot be avoided, which deposit gradually decreases the activity of the catalysts. In order to overcome such difficulties, it has been proposed to carry out the conversion with a plurality of serially disposed catalysts operating at higher and lower temperatures and periodically to drive out the sulfur collected on the catalyst operating at a temperature below the dew point of sulfur by heating such catalyst and if desired, simultaneously passing an inert gas therethrough. It has also been proposed to remove the sulfur which collects on the cooler catalyst by passing a part of the hotter gases from the same process in order to drive out the sulfur. This procedure, however, has the serious drawback that during the period such catalyst is regenerated, the conversion of the hydrogen sulfide contained in the gases employed for the regeneration is rather incomplete as the catalyst is relatively inactive because of the sulfur collected thereon and furthermore temperatures must be employed which do not favor complete conversion. The result is that the hydrogen sulfide contained in the regenerating gas practically entirely passes through the catalyst being regenerated and leaves the apparatus with such hydrogen sulfide content.

It is an object of the present invention to overcome the aforementioned difficulties in the catalytic production of sulfur from hydrogen sulfide containing gases.

In accordance with the invention, measures are taken when operating with a series of two or more catalyst bodies operating at different temperatures, that at all times the gases to be converted are passed through active catalysts. This can, for example, be accomplished in that the gas stream passing through the catalyst bodies is switched just before the activity of the catalyst body operating at a lower temperature has decreased to an undesirable degree so that the catalyst body previously operating at a lower temperature operates at a higher temperature, whereas a catalyst body previously operating at a higher temperature operates at the lower temperature. It is necessary, when operating in this fashion to separate the sulfur contained in the gas stream before it is passed through the colder catalyst body. Consequently, according to the invention the flow of the gases through the series of catalyst bodies is alternately switched periodically so that at all times it passes through a hotter catalyst body followed by a colder catalyst body so that an optimum conversion and yield is assured. Directly after switching the flow of the gases, it is desirable to cool the gases before they are passed through the catalyst body which had previously been operated at a higher temperature, but which is to operate at a lower temperature after such switch of flow. Such cooling can, for example, be achieved by the introduction of water or steam for instance by spraying. The introduction of such water or steam has the advantage that in addition to cooling the gas stream it simultaneously converts any carbon oxysulfide or carbon disulfide contained therein to hydrogen sulfide and carbon dioxide.

When carbon oxysulfide and/or carbon disulfide are present in the gases converted, it is as a rule desirable to supply water or steam thereto continuously. The quantities of such water or steam introduced are regulated so that the quantity thereof introduced into the gas stream passing thorugh the catalyst body which is to be operated at a higher temperature is decreased, whereas the quantity introduced into the gas stream passing through the catalyst which is to be operated at a lower temperature is correspondingly increased to effect the temperature regulation referred to above. The apparatus for holding the catalyst bodies can be in the form of a grid converter, which are commonly used in sulfuric acid production, and in which the gas inlets and outlets are arranged so as to be able to switch the gas stream and depending upon the prevailing conditions arranging their location so that the sulfur contained in every catalyst layer can be quickly and completely drived off. Suitable catalysts for the process according to the invention are, for example, active bauxite, a mixture of $Fe_2O_3$ and $Al_2O_3$ containing water of hydration, active alumina and the like. Suitable carriers for the catalysts are aluminate cement, gypsum, kieserite and the like. The switching of the gas stream according to the invention also provides an advantage in that any iron oxide content in the catalyst employed only is converted to the catalytically active iron sulfide at higher temperatures.

The fields of application of the process according to the invention with reference to the gases converted are rather numerous. The process according to the invention is generally applicable to the conversion of hydrogen sulfide containing gases to produce elemental sulfur, such as, for example, the conversion of hydrogen sulfide with oxygen containing gases such as air or sulfur dioxide, in the production of sulfur by the reduction of $SO_2$ with the aid of solid, liquid, or gaseous reducing agents or in the production of sulfur from gases obtained in the roasting, blowing or smelting sulfidic ores with solid fuels. Any dust contained in the gases is preferably removed before passage through the catalysts. This is especially important when sulfur dioxide containing gases have been treated with solid reducing agents.

The accompanying drawing diagrammatically shows, by way of example, an apparatus suitable for carrying out the process according to the invention, as applied to gases resulting from the reduction of sulfur dioxide containing gases with coke.

Referring to the drawing, a portion of the $SO_2$ containing gas which is supplied through conduit 1 is introduced through line 2 into the bottom of generator 6 which is supplied with coke, and the other portion of the $SO_2$ containing gas is introduced into the generator 6 through line 4 above the bed of coke contained in such generator. If desired, air can be admixed by way of line 3 with the $SO_2$ containing gas supplied to the generator through line 2. The $SO_2$ reacts with the coke to form a gas mixture which besides sulfur can contain the sulfur compounds COS, $CS_2$ and $H_2S$. The hydrogen sulfide is formed primarily from the moisture contained in the gases and the coke. The quantity of $SO_2$ introduced through line 4 is adjusted by a regulating valve 5 so that a molar ratio of $SO_2$ to

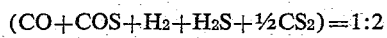

is provided in the gases leaving generator 6 through line 7.

After the dust has been separated from the gases leaving the generator in dust separator 8, the gases are supplied through line 9 to the catalyst chamber 10 maintained at temperatures of about 500–700° C. in which the conversion of $SO_2$ with the named substances takes place. Upon leaving catalyst chamber 10 through line 11, the gases which in addition to sulfur vapor primarily contain $SO_2$ and $H_2S$ and eventually small quantities of CO, COS, $H_2$ and $CS_2$, are passed through heat exchanger 12.

In heat exchanger 12 the gas is cooled to about 400–500° C., for example, with air and the cooled gas is passed through an electrofilter 14 to remove any residual dust contained therein. The dust-free gas is then passed over switching valve 15 through line 16 to catalyst chamber 18 which operates at a temperature over the dew point of sulfur of about 350 to 450° C. In order to regulate the temperature of the gas and to convert any $CS_2$ and COS contained in the gas to $H_2S$ and $CO_2$, water is introduced through line 17. The gas leaving catalyst chamber 18 through line 19 is supplied over switching valve 20 and line 21 to heat exchanger 22 from which it passes over line 23 to condenser 25. In condenser 25 the gas mixture is cooled to about 115–140° C. to condense the sulfur vapor and the gas leaving the condenser is supplied over line 26 to a water supply preheater 27. Thereafter the gas is supplied to electrofilter 29 over line 28 to remove the last sulfur droplets and subsequently passed through heat exchanger 22 through line 30. Upon leaving heat exchanger 22 the gas is introduced into the second catalyst chamber 35 which operates at 80–250° C. over line 32, switching valve 15 and line 33. Water can be supplied to the gas in line 33 to regulate the temperature thereof. In order to regulate the temperature of the gas mixtures coming from catalyst chamber 18 or electrofilter 29 by-pass lines 24 and 31 are provided so that a portion or all of such gases can by-pass heat exchanger 22.

The gas leaving catalyst chamber 35 is supplied over line 36, switching valve 37 and line 38 to washing or condensing column 39 into which liquid sulfur is sprayed. The temperature of the sulfur which is recirculated to the column 39 by means of pump 43 and line 46 is maintained at about 115 to 140° C. by a heat exchanger 44. The gas leaving column 39 through line 40 is supplied to an electrofilter 41 to remove the last droplets of sulfur. The practically $H_2S$ free exhaust gas leaves the apparatus through line 42.

An automatic regulator 45 is provided on line 30, which adjusts valve 5 by an electric impulse so that a constant molar ratio of $SO_2$ to $H_2S$ of 1:2 is maintained in the gas leaving electrofilter 29. Under certain circumstances it can be advantageous to provide for a slight excess of $SO_2$ so that the exhaust gas, for example, contains 0.1 vol. percent of $SO_2$. In some instances $SO_2$ or oxygen containing gas can be introduced into the gas leaving catalyst chamber 10, for example, by introducing such gas through line 47 into line 13 ahead of electrofilter 14.

Before the catalyst in catalyst chamber 35 loses so much of its activity through deposition of sulfur thereon that its activity no longer suffices for the desired conversion, the path of the gas stream is switched with the aid of switching valves 15, 20 and 37, so that its path after leaving electrofilter 14 is essentially through the elements designated by reference numerals 15, 33, 35, 37, 48, 29, 22, 25, 27, 29, 22, 15, 18, 20, 47, 37, 39, 41 and 42.

By thus switching the gas stream, the sulfur which was deposited on the catalyst in catalyst chamber 35 when it was operating at lower temperatures is driven off by the hot gases coming from electrofilter 14 and is collected in apparatus 25, 27 and 29 before the gas is passed for the final conversion of the $H_2S$ through catalyst chamber 18, which with this path of the gas stream is operating at the lower temperature.

Then before the catalyst in catalyst chamber 18 which is now operating at the lower temperature at which catalyst chamber 35 previously operated suffers an undesired loss in activity, switching valves 15, 20 and 37 are turned so that the original path of the gas stream is reestablished. The path of the gas stream can thus be periodically altered to maintain the desired high catalyst efficiency in the cooler operating catalyst chamber.

A number of modifications can be made in the process without departing from the spirit and scope of the invention. For example, a further catalyst chamber operating at a temperature above the dew point of the sulfur can be interposed between electrofilter 14 and switching valve 15, so that in every instance the gas passes through a catalyst operating at a higher temperature.

We claim:

1. In a process for the catalytic conversion of a gas mixture containing hydrogen sulfide and at least one of the gases oxygen and sulfur dioxide to produce sulfur, the steps which comprise passing a stream of said gas mixture through a series of catalyst bodies operating at different temperatures, at least one of said catalyst bodies being maintained at a temperature above the dew point of the sulfur vapor produced and at least another of said catalyst bodies being maintained at a temperature below the dew point of the sulfur vapor produced and periodically switching the path of the gas stream before a sufficient quantity of the sulfur is deposited on the catalyst body operating at a temperature below the dew point of the sulfur vapor produced that it suffers an undesirable loss of activity so that the catalyst body operating at the temperature below the dew point of the sulfur vapor produced subsequently operates at a temperature higher than the dew point of the sulfur vapor produced and at least one of the other catalyst bodies subsequently operates at a temperature below the dew point of the sulfur vapor produced.

2. The process of claim 1, in which the gas stream, after the path thereof is switched, is cooled before it is passed through the catalyst body which is subsequently to operate at a temperature below the dew point of the sulfur vapor produced.

3. The process of claim 2, in which said cooling is effected by the introduction of water.

4. The process of claim 1, in which water is continuously added to the gas stream and after the path thereof is switched, adding further quantities of water to cool such gas stream before it is passed through the catalyst body which is subsequently to operate at a temperature below the dew point of the sulfur vapor produced.

5. The process of claim 1, in which any dust contained in the gas stream is separated therefrom before it is passed through each catalyst body.

6. The process of claim 1, in which said gas mixture is obtained by the reduction of a sulfur dioxide containing gas with a carbonaceous reducing agent and the molal ratio of $SO_2$ to $(CO+COS+H_2+H_2S+½CS_2)$ is adjusted to 1:2.

References Cited in the file of this patent

UNITED STATES PATENTS

| | | |
|---|---|---|
| 1,782,824 | Hechenbleikner | Nov. 25, 1930 |
| 2,021,865 | Lincoln | Nov. 19, 1935 |
| 2,031,600 | Harrison et al. | Feb. 25, 1936 |
| 2,095,264 | Pew | Oct. 12, 1937 |
| 2,561,990 | Miller | July 24, 1951 |
| 2,630,374 | Miller | Mar. 3, 1953 |
| 2,665,974 | Miller | Jan. 12, 1954 |